(12) United States Patent
Bellert

(10) Patent No.: US 8,578,268 B2
(45) Date of Patent: Nov. 5, 2013

(54) RENDERING ELECTRONIC DOCUMENTS HAVING LINKED TEXTBOXES

(75) Inventor: Darrell Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 495 days.

(21) Appl. No.: 12/982,565

(22) Filed: Dec. 30, 2010

(65) Prior Publication Data

US 2012/0170077 A1    Jul. 5, 2012

(51) Int. Cl.
*G06F 17/00* (2006.01)

(52) U.S. Cl.
USPC ........................................................ 715/244

(58) Field of Classification Search
USPC .................. 715/273, 243, 244, 245, 246, 247
See application file for complete search history.

(56) References Cited

U.S. PATENT DOCUMENTS

| | | | | |
|---|---|---|---|---|
| 5,613,016 A * | 3/1997 | Saitoh | | 382/174 |
| 7,117,504 B2 * | 10/2006 | Smith et al. | | 719/328 |
| 2006/0242180 A1 * | 10/2006 | Graf et al. | | 707/101 |
| 2007/0044018 A1 * | 2/2007 | Hanechak | | 715/531 |
| 2009/0327312 A1 * | 12/2009 | Kakivaya et al. | | 707/10 |
| 2010/0269036 A1 * | 10/2010 | Berger et al. | | 715/243 |

OTHER PUBLICATIONS

Heer, J., et al, "Vizster: Visualizing Online Social Networks", Information Visualization, 2005, INFOVIS 2005, IEEE Symposium on Digital Object Identifier, pp. 32-39.*

* cited by examiner

*Primary Examiner* — Laurie Ries
(74) *Attorney, Agent, or Firm* — Osha Liang LLP

(57) ABSTRACT

A method for rendering an electronic document (ED). The method includes obtaining an intermediate format of the ED having multiple containers corresponding to multiple linked textboxes in the ED; obtaining a data structure including a root node associated with a string for distribution across the multiple linked textboxes and multiple segment nodes including multiple pointers to the multiple containers; executing a traversal of the multiple segment nodes; generating, during the traversal, multiple intermediate pages by applying a layout engine to the multiple containers referenced by the multiple pointers, where the string is distributed across the multiple intermediate pages; and generating a rendered page of the ED by substituting the container with an intermediate page corresponding to the container.

20 Claims, 6 Drawing Sheets

RENDERING ELECTRONIC DOCUMENTS HAVING LINKED TEXTBOXES

BACKGROUND

Within an electronic document (ED), a string may be distributed across a set of textboxes. In other words, the string may be partitioned into multiple segments, and each segment may be placed within a different textbox of the set. As the textboxes are effectively linked by the string, each textbox within the set may be referred to as a linked textbox. In contrast, a textbox that contains the entire contents of a string, and thus is not linked to any other textbox, may be referred to as an isolated textbox.

An ED may have multiple sets of linked textboxes. The ED includes both the dimensions (e.g., height, width) of each linked textbox in the set and the order in which the linked textboxes are to be filled with the string. It is the responsibility of a rendering device (RD) to position the set of linked textboxes on the page(s) of the ED and to distribute the characters of the string across the set of linked textboxes.

In general, layout engines within RDs are well configured to process isolated textboxes. However, linked textboxes on the same or different pages present non-trivial problems for these layout engines. Despite the potential problems for the layout engines, users still wish to create EDs with linked textboxes and use existing layout engines to process the EDs.

SUMMARY

In general, in one aspect, the invention relates to a method for rendering an electronic document (ED). The method comprises: obtaining, for input to a layout engine, an intermediate format of the ED comprising a first plurality of containers corresponding to a first plurality of linked textboxes in the ED; obtaining a data structure comprising a first root node associated with a first string for distribution across the first plurality of linked textboxes and a first plurality of segment nodes comprising a first plurality of pointers to the first plurality of containers; identifying, after obtaining the data structure, a first container of the first plurality of containers within the intermediate format; locating, in response to identifying the first container and within the data structure, the first root node having the string; executing, in response to locating the first root, a traversal of the first plurality of segment nodes linked to the first root node; generating, during the traversal of the first plurality of segment nodes, a first plurality of intermediate pages by applying the layout engine to the first plurality of containers referenced by the first plurality of pointers, wherein the first string is distributed across the first plurality of intermediate pages; and generating, after executing the traversal of the first plurality of segment nodes, a rendered page of the ED, wherein generating the rendered page comprises substituting the first container of the first plurality of containers with an intermediate page of the first plurality of intermediate pages corresponding to the first container.

In general, in one aspect, the invention relates to a non-transitory computer readable storage medium storing instructions for rendering an electronic document (ED). The instructions comprising functionality to: obtain, for input to a layout engine, an intermediate format of the ED comprising a first plurality of containers corresponding to a first plurality of linked textboxes in the ED; obtain a data structure comprising a first root node associated with a first string for distribution across the first plurality of linked textboxes and a first plurality of segment nodes comprising a first plurality of pointers to the first plurality of containers; identify, after obtaining the data structure, a first container of the first plurality of containers within the intermediate format; locating, in response to identifying the first container and within the data structure, the first root node having the string; execute, in response to locating the first root, a traversal of the first plurality of segment nodes linked to the first root node; generate, during the traversal of the first plurality of segment nodes, a first plurality of intermediate pages by applying the layout engine to the first plurality of containers referenced by the first plurality of pointers, wherein the first string is distributed across the first plurality of intermediate pages; and generate, after executing the traversal of the first plurality of segment nodes, a rendered page of the ED, wherein generating the rendered page comprises substituting the first container of the first plurality of containers with an intermediate page of the first plurality of intermediate pages corresponding to the first container.

In general, in one aspect, the invention relates to a system for rendering an electronic document. The system comprises: a hardware processor; an intermediate format generator executing on the hardware processor and configured to generate an intermediate format of the ED comprising a plurality of containers corresponding to a plurality of linked textboxes in the ED; a data structure generator configured to generate a root node associated with a string for distribution across the plurality of linked textboxes and a plurality of segment nodes comprising a plurality of pointers to the plurality of containers; and a layout engine executing on the hardware processor and configured to generate, during a traversal of the plurality of segment nodes, a plurality of intermediate pages based on the plurality of containers referenced by the plurality of pointers, wherein the string is distributed across the plurality of intermediate pages, wherein the layout engine is further configured to generate a rendered page of the ED by substituting a container of the plurality of containers in the intermediate format with an intermediate page of the plurality of intermediate pages corresponding to the container.

Other aspects of the invention will be apparent from the following description and the appended claims.

DETAILED DESCRIPTION

Figure 1:
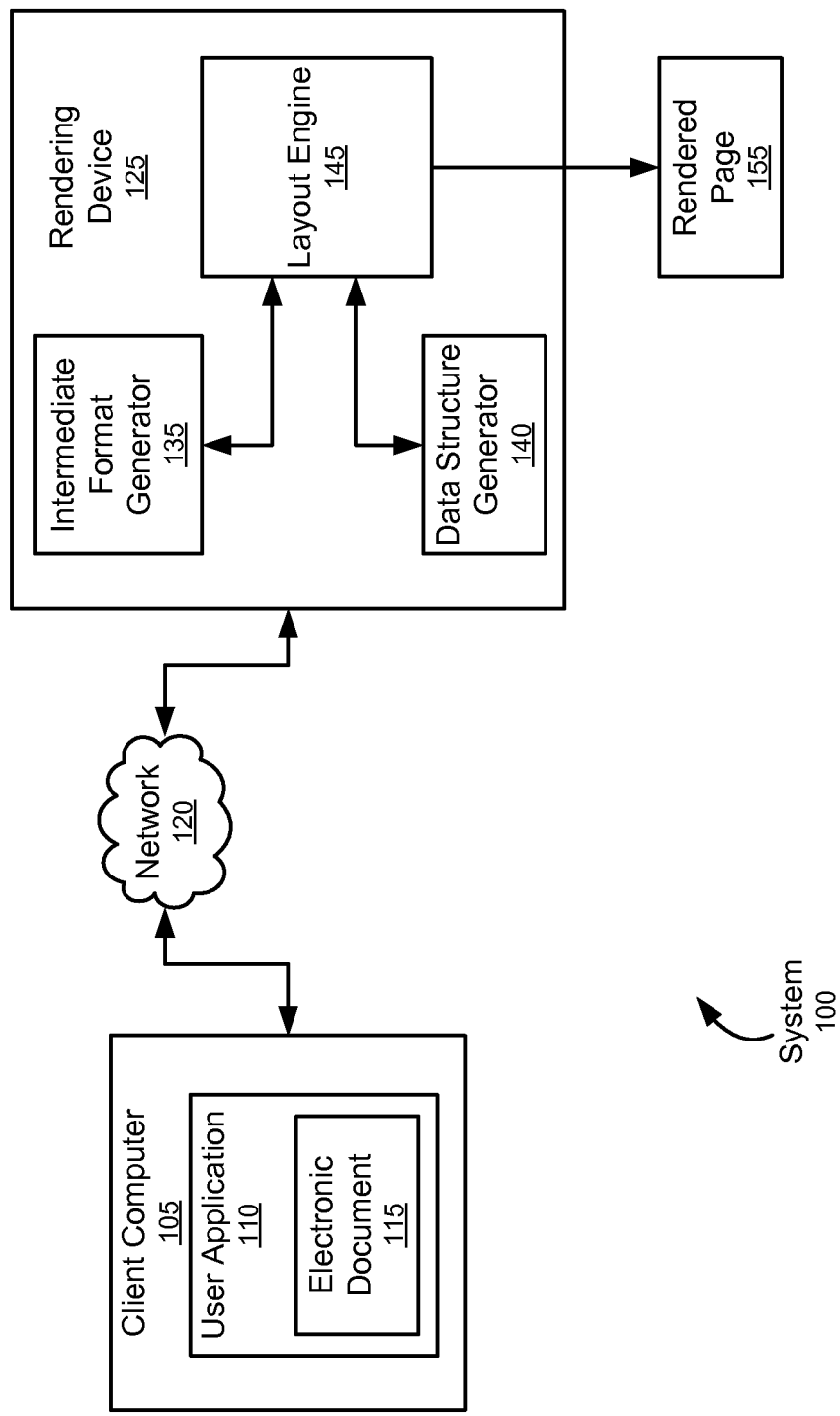
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering an ED having at least one set of linked textboxes. Specifically, an intermediate format of the ED and a data structure for the ED are generated by parsing the ED. The intermediate format includes containers corresponding to the linked textboxes. The data structure includes a root node for the set of linked textboxes and a segment node for each linked textbox in the set. A segment node includes a pointer to its corresponding container in the intermediate format. Upon encountering a container corresponding to a linked textbox, intermediate pages for all linked textboxes in the set are generated. The intermediate pages are substituted for the containers in the rendered page(s).

FIG. 1 shows a system (100) in accordance with one or more embodiments of the invention. As shown in FIG. 1, the system (100) has multiple components including a rendering device (RD) (125) and a client computer (105). The RD (125) may be, for example, a printer, an electronic reader, etc. The client computer (105) may be a personal computer (PC), a desktop computer, a mainframe, a server, a telephone, a kiosk, a cable box, a personal digital assistant (PDA), a mobile phone, a smart phone, etc. There may be a direct connection (e.g., universal serial bus (USB) connection) between the client computer (105) and the RD (125). Alternatively, the client computer (105) and the RD (125) may be connected using a network (120) having wired and/or wireless segments.

In one or more embodiments of the invention, the RD (125) is located on the client computer (105). In such embodiments, the RD (125) corresponds to any combination of hardware and software on the client computer (105) for generating, displaying, and/or printing an ED.

In one or more embodiments of the invention, the client computer (105) executes a user application (110). The user application (110) is a software application operated by a user and configured to obtain, input, generate, display and/or print an ED (115). Accordingly, the user application (110) may be a word-processing application, a spreadsheet application, a desktop publishing application, a graphics application, a photograph printing application, an Internet browser, etc. The user application (110) may generate new EDs and/or obtain previously saved EDs.

Figure 2:
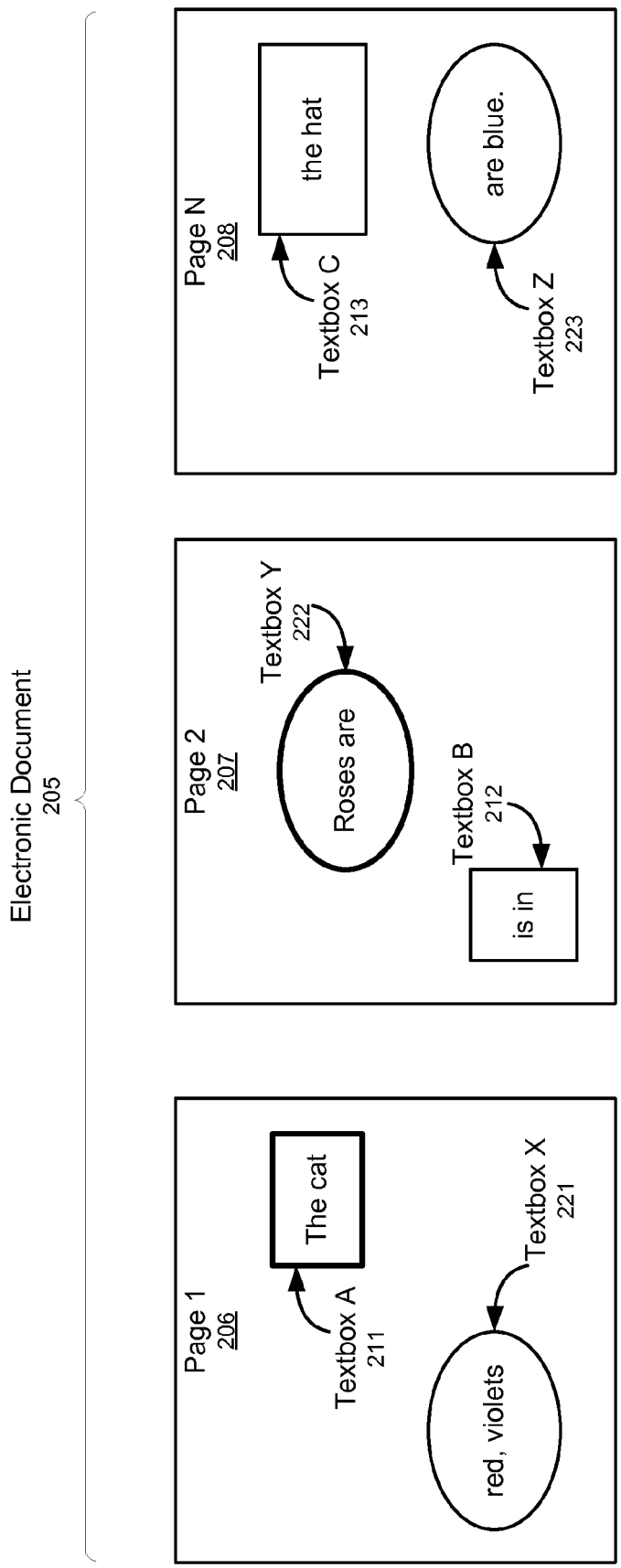
FIG. 2 shows an ED in accordance with one or more embodiments of the invention.

FIG. 2 shows an ED (205) in accordance with one or more embodiments of the invention. The ED (205) may correspond to the ED (115), discussed above in reference to FIG. 1. As shown in FIG. 2, the ED (205) has two sets of linked textboxes. Specifically, Textbox A (211), Textbox B (212), Textbox C (213) form one set of linked textboxes. Similarly, Textbox X (221), Textbox Y (222), and Textbox Z (223) form another set of linked textboxes. Textbox A (211) and the Textbox X (221) are located on page 1 (206) of the ED (205). Further, Textbox Y (222) and Textbox B (212) are located on page 2 (207) of the ED (205). Further still, Textbox C (213) and Textbox Z (223) are located on page N (208) of the ED (205).

Still referring to FIG. 2, the string "The cat is in the hat" is distributed across the set of linked textboxes including Textbox A (211), Textbox B (212), and Textbox C (213). In other words, the string "The cat is in the hat" has been partitioned into three non-overlapping segments, and each segment has been placed in one of Textbox A (211), Textbox B (212), or Textbox C (213). As shown in FIG. 2, Textbox A (211) has the initial segment (i.e., segment number 1) of the string, Textbox B (212) has an intermediate segment (i.e., segment number 2) of the string, and Textbox C (213) has the final segment (i.e., segment number 3) of the string. The segment numbers effectively assign an order to the set of linked textboxes.

Similarly, the string "Roses are red, violets are blue" is distributed across the set of linked textboxes including Textbox X (221), Textbox Y (222), and Textbox Z (223). In other words, the string "Roses are red, violets are blue" has been partitioned into three non-overlapping segments, and each segment has been placed in one of Textbox X (221), Textbox Y (222), or Textbox Z (223). As shown in FIG. 2, Textbox Y (222) has the initial segment (i.e., segment number 1) of the string, Textbox X (221) has an intermediate segment (i.e., segment number 2) of the string, and Textbox Z (223) has the final segment (i.e., segment number 3) of the string. The segment numbers effectively assign an order to the set of linked textboxes.

As shown in FIG. 2, the string "The cat is in the hat" starts in the textbox A (211). As also shown in FIG. 2, the string "Roses are red, violets are blue" starts in Textbox Y (222). Accordingly, Textbox A (211) and Textbox Y (222) may be referred to as starting textboxes for their respective set of linked textboxes. In other words, Textbox A (211) and Textbox Y (222) have the first segment of their respective strings.

The order in which Textbox A (211), Textbox B (212), and Textbox C (213) appear within the ED (205) matches the order of text flow for the string "The cat is in the hat." However, the order in which Textbox X (221), Textbox Y (222), and Textbox Z (223) appear within the ED (205) does not match the order of text flow for the string "Roses are red, violets are blue." In other words, a reader would encounter Textbox X (221) before encountering Textbox Y (222), even though Textbox Y (222) is the starting textbox of the set of linked textboxes including Textbox Y (222), Textbox X (221), and Textbox Z (223).

Referring back to FIG. 1, in one or more embodiments of the invention, the ED (115) is represented/defined using a document markup language (e.g., ODF, OOXML, etc.). Accordingly, the string for distribution across the set of linked textboxes, the segment numbers (i.e., order assigned to the linked textboxes in the set), the dimensions (i.e., height, width) of the linked textboxes, etc. may be recorded as attributes within the tags of the document markup language.

In one or more embodiments of the invention, the RD (125) has an intermediate format generator (135). The intermediate format generator (135) is configured to parse the ED (115) and generate an intermediate format of the ED (115). The intermediate format includes containers representing the linked textboxes of the ED (115). Each container includes the attributes of its corresponding textbox (e.g., dimensions, segment number, etc.) In one or more embodiments of the invention, each container in the intermediate format also has a set identifier (ID) as an attribute. Specifically, all containers corresponding to linked textboxes of the same set are assigned the same set ID. In one or more embodiments of the invention, the container corresponding to a starting textbox includes the string for the set of linked textboxes.

Figure 3:
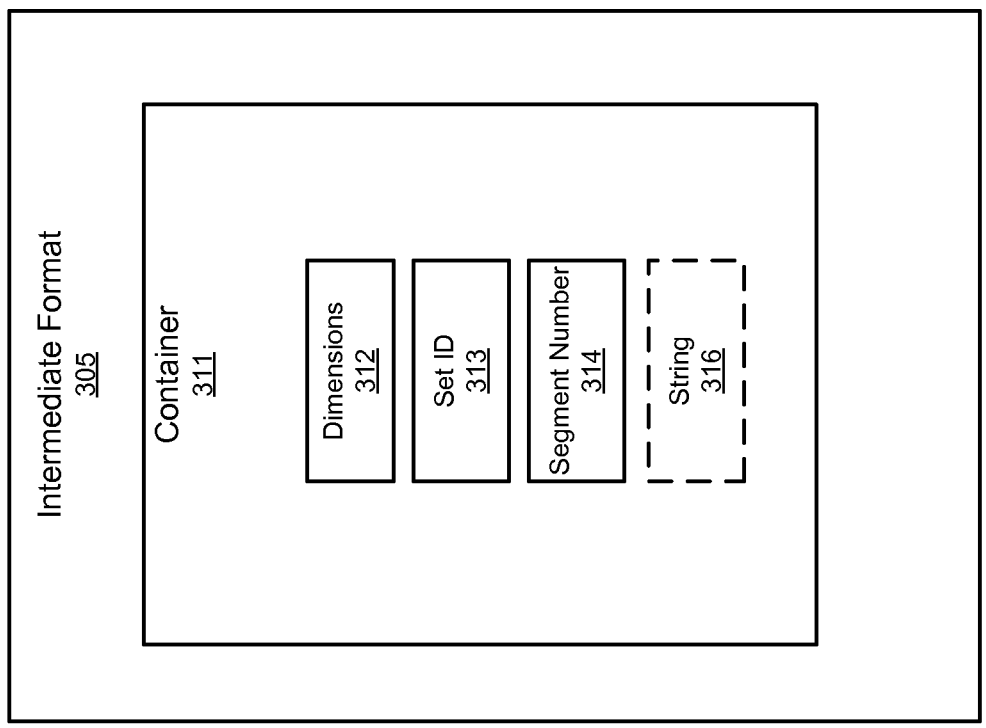
FIG. 3 shows a container within an intermediate format of an ED in accordance with one or more embodiments of the invention.

FIG. 3 shows a container (311) of an intermediate format (305) in accordance with one or more embodiments of the invention. The container (311) represents a linked textbox in an ED. As shown in FIG. 3, the container (311) has several attributes including a dimensions attribute (312) storing the dimensions of the linked textbox, a set ID attribute (313) identifying the set to which the linked textbox belongs, a segment number attribute (314) identifying the position of the linked textbox in the set of linked textboxes, and optionally a string attribute (316) storing the string for distribution across the set of linked textboxes.

Referring back to FIG. 1, in one or more embodiments of the invention, the RD (125) has a data structure generator (140). The data structure generator (140) is configured to generate and populate a data structure for tracking and accessing the set(s) of linked textboxes in the ED (115) and/or the containers in the intermediate format (discussed above). Specifically, the data structure includes a root node for each set of linked textboxes in the ED (115). Each root node stores the set ID of the corresponding set of linked textboxes and the string for distribution across the set of linked textboxes. Alternatively, in one or more embodiments of the invention, one or more of the root nodes store pointers to their respective strings instead of the strings. Further, in one or more embodiments of the invention, only the root nodes store the strings or pointers to the strings (i.e., the containers (discussed above) do not store the strings).

Accessible from the root node is a set of segment nodes representing the linked textboxes in the set. Each segment node stores a pointer referencing a container in the intermediate format which includes the segment number of the linked textbox represented by the container. The segment nodes for a set of linked textboxes may be sorted in any order including the order of the text flow. Further, the data structure may be implemented using one or more arrays, linked lists, trees, etc.

Figure 4:
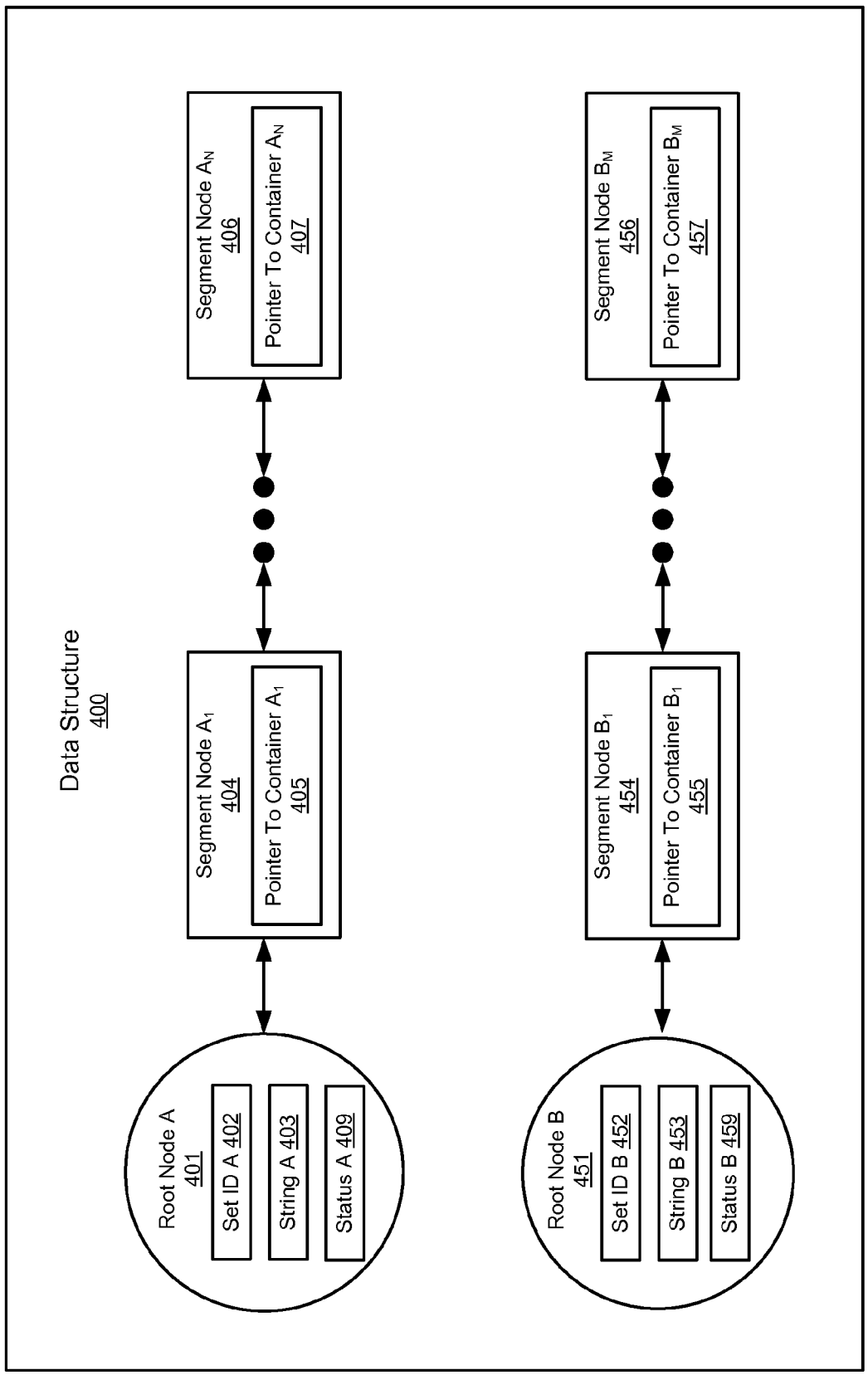
FIG. 4 shows a data structure in accordance with one or more embodiments of the invention.

FIG. 4 shows a data structure (400) in accordance with one or more embodiments of the invention. As shown in FIG. 4, the data structure (400) includes multiple root nodes (i.e., Root Node A (401), Root Node B (451)) linked to multiple segment nodes (i.e., Segment Node $A_1$ (404), Segment Node $A_N$ (406), Segment Node $B_1$ (454), Segment Node $B_M$ (456)). Segment Node $A_1$ (404), Segment Node $A_N$ (406) are both accessible (i.e., may be traversed) from Root Node A (401). Similarly, Segment Node $B_1$ (454) and Segment Node $B_M$ (456) are both accessible (i.e., may be traversed) from Root Node B (451).

In one or more embodiments of the invention, Root Node A (401) and Root Node B (451) correspond to different sets of linked textboxes in the same ED. Accordingly, Root Node A (401) stores set ID A (402) identifying one of the two sets of linked textboxes, while Root Node B (451) stores set ID B (452) identifying the other set of linked textboxes. As shown in FIG. 4, both Root Node A (401) and Root Node B (451) store strings (or pointers to strings) (i.e., String A (403), String B (453)) for distribution across their respective set of linked textboxes.

In one or more embodiments of the invention, the segment nodes (404, 406, 454, 456) include pointers referencing their respective containers in the intermediate format. Specifically, Segment Node $A_1$ (404) has the Pointer to Container $A_1$ (405), Segment Node $A_N$ (406) has the Pointer to Container $A_N$ (407), Segment Node $B_1$ (454) has the Pointer to Container $B_1$ (455), and Segment Node $B_M$ (456) has the Pointer to Container $B_M$ (457).

In one or more embodiments of the invention, each root node (401, 451) has a status field (i.e., Status A (409), Status B (459)). The status field (409, 459) is set to "complete" or "completed" when intermediate pages have been generated for all segment nodes attached to the root node (discussed below). For example, Status A (409) is set to "complete" or "completed" when intermediate pages have been generated for Segment Node $A_1$ (404) and Segment Node $A_N$ (406). Similarly, Status B (459) is set to "complete" or "completed" when intermediate pages have been generated for Segment Node $B_1$ (454) and Segment Node $B_M$ (456). When a status field (409, 459) is not set to "complete" or "completed," the status field (409, 459) may be empty, set to "NULL," set to "incomplete," etc.

Referring back to FIG. 1, in one or more embodiments of the invention, the RD (125) has a layout engine (145). The layout engine (145) is configured to calculate, by consuming the intermediate format, the positions/placement of the columns, textboxes, paragraphs, strings, words, characters, subheadings, subtitles, images, etc. of the ED (115) on a readable medium (e.g., paper, transparencies, microfilm, computer monitor, an electronic reader, etc.). In other words, the layout engine (145) is configured to generate and output rendered pages (e.g., Rendered Page (155)) of the ED (115).

In one or more embodiments of the invention, the layout engine (145) is configured to calculate the position (i.e., coordinates) of the characters of the string segment in a linked textbox. In such embodiments, the input to the layout engine (145) includes the container (discussed above) representing the linked textbox, while the output of the layout engine (145) includes an intermediate page and the positions (i.e., coordinates) of the characters of the string segment within the intermediate page. The dimensions (i.e., boundary) of the intermediate page correspond to the dimensions (i.e., boundary) of the linked textbox. In one or more embodiments of the invention, the layout engine (145) is configured to render pages of the ED (115) by substituting containers in the intermediate format with their corresponding intermediate pages.

Figure 5:
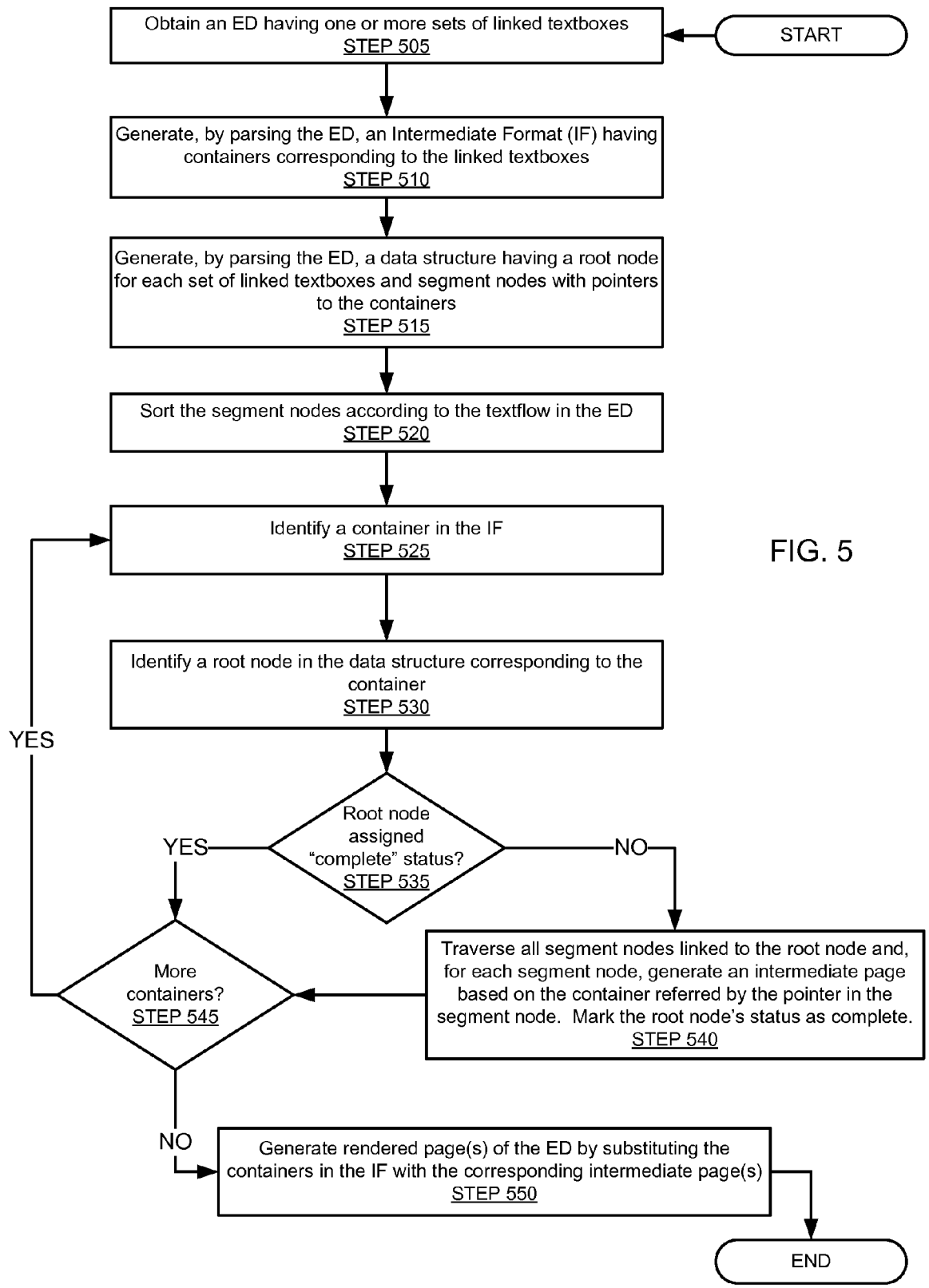
FIG. 5 shows a flowchart in accordance with one or more embodiments of the invention.

FIG. 5 shows a flowchart in accordance with one or more embodiments of the invention. The process shown in FIG. 5 may be used, for example, with the components of the system (100) (e.g., RD (125)) to render an ED having linked textboxes. The sequence of steps shown in FIG. 5 may differ among embodiments of the invention, and one or more of the steps may be performed in parallel and/or may be optional.

In STEP 505, an ED having at least one set of linked textboxes is obtained. The ED may be represented/defined using a document markup language (e.g., ODF, OOXML, etc.). Accordingly, the string for distribution across the set of linked textboxes, the segment numbers (i.e., order assigned to the linked textboxes in the set), the dimensions (i.e., height, width) of the linked textboxes, etc. may be recorded as attributes within the tags of the document markup language. The starting textbox (i.e., the linked textbox having the initial segment of the string) might or might not be the first linked textbox encountered by a reader of the ED.

In STEP 510, an intermediate format (IF) of the ED is generated. Specifically, the IF includes containers corresponding to the linked textboxes. A container includes the attributes of its corresponding linked textbox (e.g., dimensions, segment number, etc.). Further, a container corresponding to a starting textbox may also include the string for distribution across the set of linked textboxes. Further still, all containers corresponding to linked textboxes within the same set of linked textboxes may include the same set ID. In one or more embodiments of the invention, the IF is suitable for consumption by a layout engine (e.g., layout engine (145), discussed above in reference to FIG. 1) and generated by parsing the ED. In one or more embodiments of the invention, the IF is generated by the Intermediate Format Generator (135) in the RD (125).

In STEP 515, a data structure is generated. The data structure includes nodes for tracking and accessing the set(s) of linked textboxes in the ED and/or the containers in the IF. Specifically, the data structure includes a root node for each set of linked textboxes in the ED. Each root node stores the set ID of the corresponding set of linked textboxes and the string (or a pointer to the string) for distribution across the set of linked textboxes. Accessible from the root node is a set of segment nodes representing the linked textboxes in the set. Each segment node stores a pointer referencing a container in the intermediate format which includes the segment number of the linked textbox represented by the container. The segment nodes for a set of linked textboxes may be sorted in any order including the order of the text flow.

In one or more embodiments of the invention, the data structure is generated/populated during the parsing of the ED and the creation of the intermediate format (STEP 510). Specifically, once a container representing a linked textbox in a set of linked textboxes is identified, a segment node for the container/textbox is generated and added to the chain of segment nodes linked to the appropriate root node. The newly generated segment node stores a pointer referencing the container.

In STEP 520, the segment nodes in the data structure are sorted according to the text flow of the string. In one or more embodiments of the invention, STEP 520 occurs after the ED has been completely parsed. As discussed above, segment nodes may be added to the data structure (i.e., linked/chained to the appropriate root node) in the order their corresponding linked textboxes appear in the ED. Accordingly, the initial order of the segment nodes in the data structure might or might not correspond to the text flow of the string. In one or more embodiments of the invention, the data structure is generated by and the segment nodes are sorted by the data structure generator (140) in the RD (125).

In STEP 525, a container in the IF is identified. The container may be identified during the consumption of the IF by a layout engine (e.g., the layout engine (145) in the RD (125)). As discussed above, a container represents a linked textbox in the ED and has the attributes of the linked textbox. As also discussed above, the container includes a set ID for identifying the corresponding set of linked textboxes having the linked textbox.

In STEP 530, the root node corresponding to the identified container (i.e., STEP 525) is identified in the data structure. Specifically, the root node may be located in the data structure using the set ID of the container as a search criterion. Alternatively, in one or more embodiments of the invention, the container stores a pointer to the root node, thereby eliminating the need for searching. In STEP 535, it is determined whether the root node has a "complete" or "completed" status. The status of the root node may be accessed by reading the status field of the root node (e.g., Status A (409), Status B (459), discussed above in reference to FIG. 4). When it is determined that the root node has been assigned a "complete" or "completed" status, the process proceeds to STEP 545. When it is determined that the root node has not been assigned a "complete" or "completed" status, the process proceeds to STEP 540.

In STEP 540, a traversal of all segment nodes linked to the root node is executed and an intermediate page is generated for each encountered segment node. As discussed above, each segment node includes a pointer to a container in the IF. As also mentioned above, each container includes the attributes (e.g., segment number, dimensions) of its corresponding linked textbox. Further, as the segment nodes have been sorted (i.e., ordered) according to the text flow of the string (i.e., STEP 520), the order in which the segment nodes are traversed will essentially be dictated by the segment numbers. In other words, the segment node corresponding to the container of segment number 1 will be encountered first during the traversal. The segment node corresponding to the container of segment number 2 will be encountered second during the traversal, etc.

For each segment node encountered during the traversal, a function of the layout engine is called to generate an intermediate page for the corresponding linked textbox. The parameters of the function include the container and the remaining portion of the string that still needs to be placed within one or more of the linked textboxes. Accordingly, for the starting textbox, the remaining portion of the string is the entire string. The output of the function is the intermediate page and the positions (i.e., coordinates) of all characters in the segment of the string placed within the intermediate page. The intermediate pages may be labeled by their segment numbers.

In one or more embodiments of the invention, when intermediate pages have been generated for all segments nodes linked to the root node, the status of the root node is set to "complete" or "completed."

In STEP 545, it is determined whether additional containers exist in the IF. When it is determined that additional containers exist, the process returns to STEP 525. When it is determined that no additional containers exist in the IF, the process proceeds to STEP 550.

In STEP 550, one or more rendered pages of the ED are generated. The rendered page(s) may be generated by substituting the containers in the IF with the corresponding intermediate page(s). Specifically, for each container encountered, the corresponding intermediate page is retrieved using at least the segment number and set ID of the container as a search criterion. The rendered page(s) will include the set(s) of linked textboxes and the string(s) distributed across the set(s) of linked textboxes.

In one or more embodiments of the invention, STEPS 505, 510, 515, and 520 correspond to a document parsing phase or main document construction phase. In one or more embodiments of the invention, STEPS 525, 530, 535, 540, 545, and 550 correspond to a main document typeset phase.

Embodiments of the invention have one or more of the following advantages: the ability to render pages having linked textboxes using existing rendering devices; the ability to handle multiple sets of linked textboxes within an ED; the ability to render linked textboxes that are not positioned within the ED according to the text flow of the string (i.e., the starting textbox is not the first textbox encountered by a reader); etc. Those skilled in the art will appreciate that there are various other advantages of the present invention that have not been disclosed.

Figure 6:
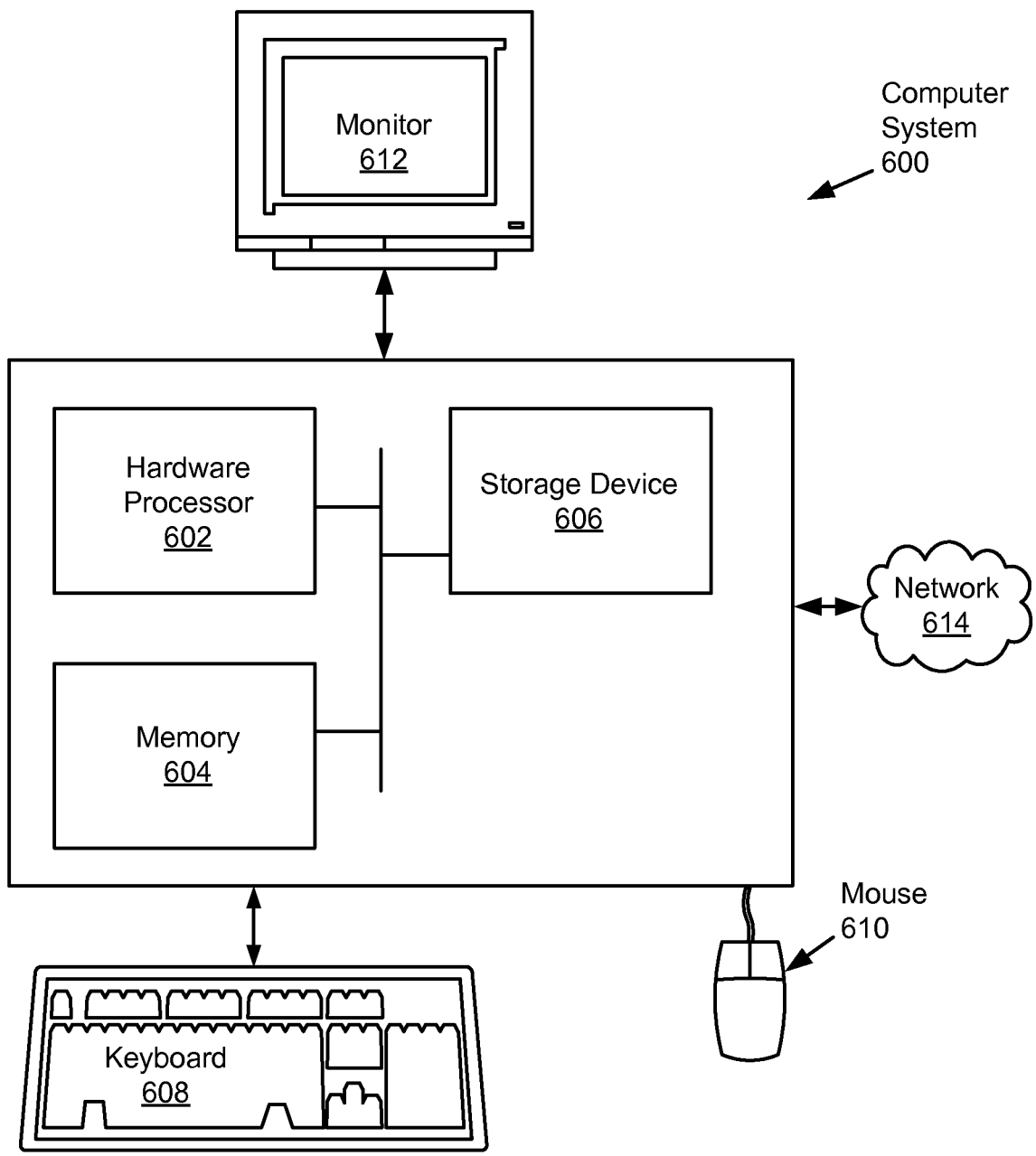
FIG. 6 shows a computer system in accordance with one or more embodiments of the invention.

Embodiments of the invention may be implemented on virtually any type of computer regardless of the platform being used. For example, as shown in FIG. 6, computer system (600) includes one or more hardware processor(s) (602), associated memory (604) (e.g. random access memory (RAM), cache memory, flash memory, etc.), storage device (606) (e.g. a hard disk, an optical drive such as a compact disk drive or digital video disk (DVD) drive, a flash memory stick, etc.), and numerous other elements and functionalities typical of today's computers (not shown). In one or more embodiments of the invention, hardware processor (602) is a hardware element. For example, the processor may be an integrated circuit, central processing unit (CPU) or other hardware processor. Computer system (600) may also include input means, such as keyboard (608), mouse (610), or a microphone (not shown). Further, computer system (600) may include output means, such as monitor (612) (e.g. a liquid crystal display (LCD), a plasma display, or cathode ray tube (CRT) monitor). Computer system (600) may be connected to network (614) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., intermediate format generator, data structure generator, layout engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a punch card, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering an electronic document (ED), comprising:
    obtaining, for input to a layout engine, an intermediate format of the ED comprising a first plurality of containers corresponding to a first plurality of linked textboxes in the ED;
    obtaining a data structure comprising a first root node associated with a first string for distribution across the first plurality of linked textboxes and a first plurality of segment nodes comprising a first plurality of pointers to the first plurality of containers;
    identifying, after obtaining the data structure, a first container of the first plurality of containers within the intermediate format;
    locating, in response to identifying the first container and within the data structure, the first root node having the string;
    executing, in response to locating the first root, a traversal of the first plurality of segment nodes linked to the first root node;
    generating, during the traversal of the first plurality of segment nodes, a first plurality of intermediate pages by applying the layout engine to the first plurality of containers referenced by the first plurality of pointers, wherein the first string is distributed across the first plurality of intermediate pages; and
    generating, after executing the traversal of the first plurality of segment nodes, a rendered page of the ED, wherein generating the rendered page comprises substituting the first container of the first plurality of containers with an intermediate page of the first plurality of intermediate pages corresponding to the first container.

2. The method of claim 1, further comprising:
    assigning, after executing the traversal of the first plurality of segment nodes, a completed status to the first root node;
    identifying, within the intermediate format and before generating the rendered page, a second container of the first plurality of containers;
    locating, within the data structure, the first root node in response to identifying the second container of the first plurality of containers;
    identifying the completed status assigned to the first root node; and
    returning to the intermediate format in response to identifying the competed status assigned to the first root node.

3. The method of claim 2, further comprising:
    identifying, after executing the traversal of the first plurality of segment nodes and before identifying the second container of the first plurality of containers, a container of a second plurality of containers within the intermediate format;
    locating, in response to identifying the container of the second plurality of containers, a second root node in the data structure;
    executing, in response to locating the second root node, a traversal of a second plurality of segment nodes linked to the second root node and comprising a second plurality of pointers to the second plurality of containers; and
    generating, during the traversal of the second plurality of segment nodes, a second plurality of intermediate pages by applying the layout engine to the second plurality of containers referenced by the second plurality of pointers,
    wherein the second plurality of containers correspond to a second plurality of linked textboxes within the ED,
    wherein the second root node comprises a second string for distribution across the second plurality of textboxes, and
    wherein generating the rendered page further comprises substituting the container of the second plurality of containers with an intermediate page of the second plurality of intermediate pages corresponding to the container.

4. The method of claim 1, wherein obtaining the intermediate format comprises generating the intermediate format during a parsing of the ED, and wherein obtaining the data structure comprises generating the data structure during the parsing of the ED.

5. The method of claim 4, further comprising:
    sorting the first plurality of segment nodes according to a text flow of the first string,
    wherein the first plurality of linked textboxes comprises a first textbox displaying a start of the first string and a second textbox, and
    wherein the second textbox appears within the ED before the first textbox.

6. The method of claim 1, wherein generating the first plurality of intermediate pages comprises:
    visiting a segment node during the traversal of the first plurality of segment nodes; and
    accessing, using a pointer of the segment node, a size attribute of the first container of the first plurality of containers,
    wherein the first container of the first plurality of containers corresponds to a textbox of the first plurality of linked textboxes,
    wherein the size attribute comprises a size of the textbox,
    wherein applying the layout engine comprises calling a function of the layout engine having the size of the textbox and the first string as parameters, and wherein the intermediate page of the first plurality of intermediate pages has a size equaling the size of the textbox.

7. The method of claim 1, wherein the intermediate format comprises an identification (ID) value for the first plurality of containers, wherein the first root node comprises the ID value, and wherein locating the first root node comprises searching the data structure based on the ID value.

8. The method of claim 1, wherein substituting the first container with the intermediate page comprises:
   accessing a segment number associated with the first container, wherein the first plurality of containers are assigned a plurality of segment numbers based on an order of the first plurality of textboxes in the ED; and
   calling a retrieval function having the segment number as a parameter.

9. The method of claim 1, wherein the layout engine is located on a printer.

10. A non-transitory computer readable storage medium storing instructions for rendering an electronic document (ED), the instructions comprising functionality to:
    obtain, for input to a layout engine, an intermediate format of the ED comprising a first plurality of containers corresponding to a first plurality of linked textboxes in the ED;
    obtain a data structure comprising a first root node associated with a first string for distribution across the first plurality of linked textboxes and a first plurality of segment nodes comprising a first plurality of pointers to the first plurality of containers;
    identify, after obtaining the data structure, a first container of the first plurality of containers within the intermediate format;
    locate, in response to identifying the first container and within the data structure, the first root node having the string;
    execute, in response to locating the first root, a traversal of the first plurality of segment nodes linked to the first root node;
    generate, during the traversal of the first plurality of segment nodes, a first plurality of intermediate pages by applying the layout engine to the first plurality of containers referenced by the first plurality of pointers, wherein the first string is distributed across the first plurality of intermediate pages; and
    generate, after executing the traversal of the first plurality of segment nodes, a rendered page of the ED, wherein generating the rendered page comprises substituting the first container of the first plurality of containers with an intermediate page of the first plurality of intermediate pages corresponding to the first container.

11. The non-transitory computer readable storage medium of claim 10, the instructions comprising further functionality to:
    assign, after executing the traversal of the first plurality of segment nodes, a completed status to the first root node;
    identify, within the intermediate format and before generating the rendered page, a second container of the first plurality of containers;
    locate, within the data structure, the first root node in response to identifying the second container of the first plurality of containers;
    identify the completed status assigned to the first root node; and
    return to the intermediate format in response to identifying the competed status assigned to the first root node.

12. The non-transitory computer readable storage medium of claim 11, the instructions comprising further functionality to:
    identify, after executing the traversal of the first plurality of segment nodes and before identifying the second container of the first plurality of containers, a container of a second plurality of containers within the intermediate format;
    locate, in response to identifying the container of the second plurality of containers, a second root node in the data structure;
    execute, in response to locating the second root node, a traversal of a second plurality of segment nodes linked to the second root node and comprising a second plurality of pointers to the second plurality of containers; and
    generate, during the traversal of the second plurality of segment nodes, a second plurality of intermediate pages by applying the layout engine to the second plurality of containers referenced by the second plurality of pointers,
    wherein the second plurality of containers correspond to a second plurality of linked textboxes within the ED,
    wherein the second root node comprises a second string for distribution across the second plurality of textboxes, and
    wherein generating the rendered page further comprises substituting the container of the second plurality of containers with an intermediate page of the second plurality of intermediate pages corresponding to the container.

13. The non-transitory computer readable storage medium of claim 10, wherein the instructions to obtain the intermediate format comprise functionality to generate the intermediate format during a parsing of the ED, and wherein the instructions to obtain the data structure comprise functionality to generate the data structure during the parsing of the ED.

14. The non-transitory computer readable storage medium of claim 13, wherein the instructions further comprise functionality to:
    sort the first plurality of segment nodes according to a text flow of the first string,
    wherein the first plurality of linked textboxes comprises a first textbox displaying a start of the first string and a second textbox, and
    wherein the second textbox appears within the ED before the first textbox.

15. The non-transitory computer readable storage medium of claim 10, wherein the instructions to generate the first plurality of intermediate pages comprise functionality to:
    visit a segment node during the traversal of the first plurality of segment nodes; and
    access, using a pointer of the segment node, a size attribute of the first container of the first plurality of containers,
    wherein the first container of the first plurality of containers corresponds to a textbox of the first plurality of linked textboxes,
    wherein the size attribute comprises a size of the textbox,
    wherein applying the layout engine comprises calling a function of the layout engine having the size of the textbox and the first string as parameters, and
    wherein the intermediate page of the first plurality of intermediate pages has a size equaling the size of the textbox.

16. A system for rendering an electronic document, comprising:
    a hardware processor;
    an intermediate format generator executing on the hardware processor and configured to generate an intermediate format of the ED comprising a plurality of containers corresponding to a plurality of linked textboxes in the ED;

a data structure generator configured to generate a root node associated with a string for distribution across the plurality of linked textboxes and a plurality of segment nodes comprising a plurality of pointers to the plurality of containers; and a layout engine executing on the hardware processor and configured to generate, during a traversal of the plurality of segment nodes, a plurality of intermediate pages based on the plurality of containers referenced by the plurality of pointers, wherein the string is distributed across the plurality of intermediate pages, wherein the layout engine is further configured to generate a rendered page of the ED by substituting a container of the plurality of containers in the intermediate format with an intermediate page of the plurality of intermediate pages corresponding to the container.

17. The system of claim 16, wherein the intermediate format generator, the data structure generator, and the layout engine are located on a printer.

18. The system of claim 16, wherein the data structure module is further configured to assign, after the traversal of the plurality of segment nodes, a completed status to first root node.

19. The system of claim 16, wherein the intermediate format comprises an identification (ID) value for the plurality of containers, and wherein the plurality of segment nodes comprise a plurality of segment values corresponding to an order of the plurality of textboxes in the ED.

20. The system of claim 16, wherein the data structure module is further configured to sort the plurality of segment nodes according to a text flow of the string, wherein the plurality of linked textboxes comprises a first textbox displaying a start of the first string and a second textbox, and wherein the second textbox appears within the ED before the first textbox.

* * * * *